May 19, 1970      A. D. LE VANTINE      3,513,306
MULTIMODULAR COLLIMATED LIGHT PROJECTION SYSTEM
Filed July 24, 1967      3 Sheets-Sheet 1
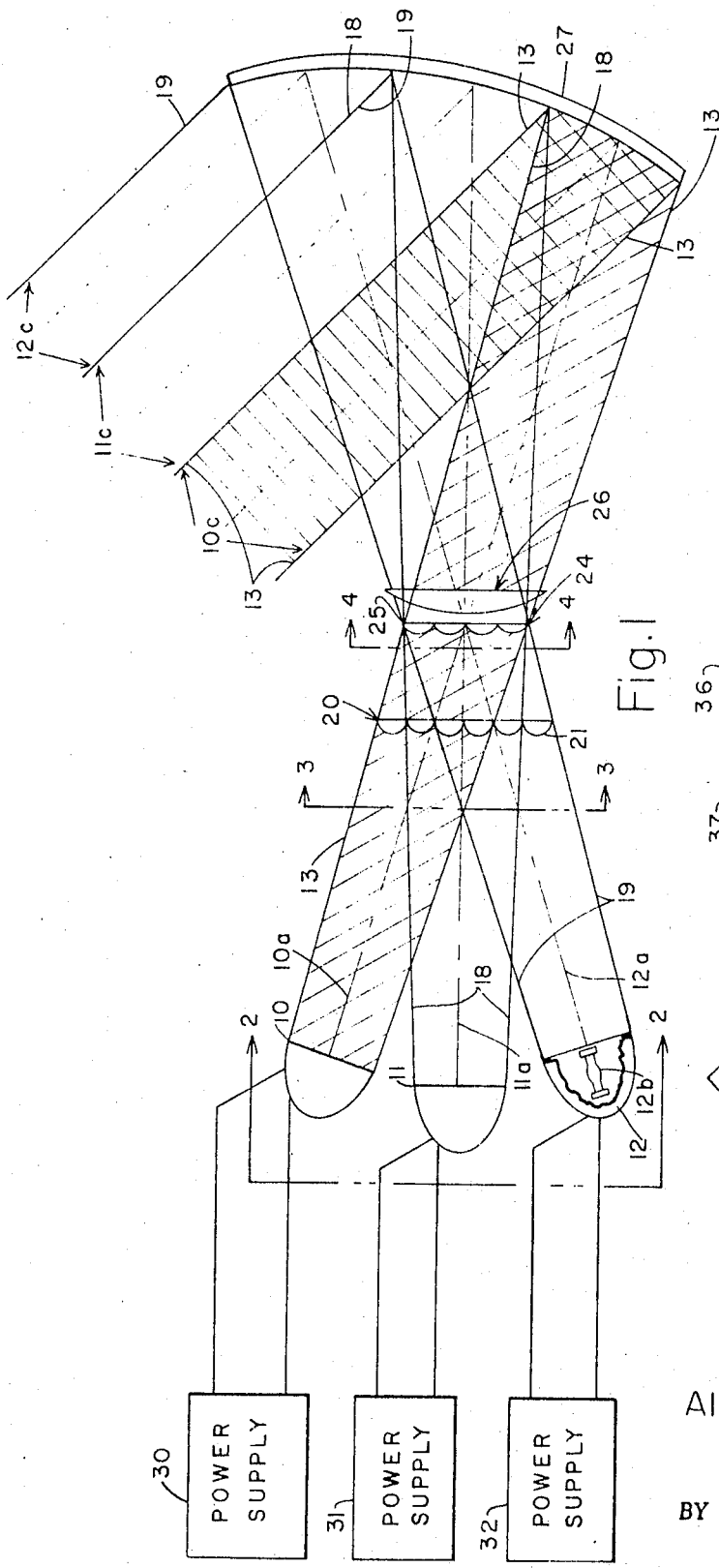
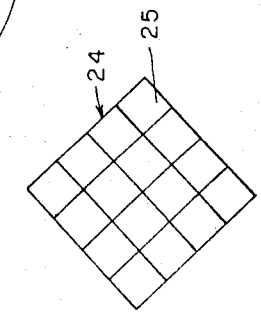
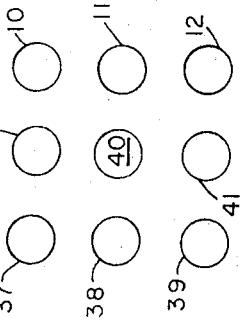
Allan D. Le Vantine
*INVENTOR.*
BY
ATTORNEY Allan D. Le Vantine
INVENTOR.

BY
ATTORNEY

United States Patent Office 3,513,306
Patented May 19, 1970

3,513,306
MULTIMODULAR COLLIMATED LIGHT PROJECTION SYSTEM
Allan D. Le Vantine, Tarzana, Calif., assignor to TRW Inc., Redondo Beach, Calif., a corporation of Ohio
Filed July 24, 1967, Ser. No. 655,475
Int. Cl. F21v 7/00; 9/02, 13/04
U.S. Cl. 240—41.3
29 Claims

ABSTRACT OF THE DISCLOSURE

A radiant energy collimating system having discrete light sources, the radiant energy from which is distributed onto a collimator, through mosaic lenses and an aligning lens in discrete, uniform fields of light to form one continuous, uniform field. The system has several discrete light sources each in combination with a single lens and a single reflecting collimator in which a discrete uniform field of light is distributed by said collimator for each of said light sources, thereby producing and forming a single continuous field from all of said discrete light sources.

BACKGROUND OF THE INVENTION

This invention relates to radiation beam forming apparatus whereby the beams formed are projected onto a field through a collimator. It pertains to the use of discrete, high intensity light sources from which output beams are produced, each also being discrete when projected onto a collimator.

The following U.S. patents are known prior art: 2,326,970; 3,187,583; 3,225,188; 3,239,660; 3,244,931; 3,247,367; 3,264,467; and 3,296,432.

In the prior art production of high intensity radiation into parallel rays from a collimator it has been found to be particularly difficult to produce a uniformly illuminated field from the collimator. This problem has particularly occurred in solar simulators.

SUMMARY OF THE INVENTION

The present invention was particularly devised for use in a solar simulator but it may be used wherever a high intensity uniform field of light is desired. The invention is comprised of a plurality of discrete light sources, each having its own collector, and the beams from each source are passed through a pair of mosaic lenses and an aligning lens. The output beam from the aligning lens is directed onto an off-axis portion of a paraboloidal collimator from which is reflected an output beam made up of discrete beams of uniform fields of light produced by the discrete sources, the beams and the sources being parts of separately operated and controlled ray systems, forming a modular system. The separate beams are perfectly mated so as to produce a continuous field on the collimator and in the field reflected therefrom.

When used as a solar simulator, the collimator reflects the beam to a target region where it produces the effects of a real image of light apertures formed in the projection system of mosaic lenses and the aligning lens, the image being at infinity.

An object of the invention is to project more than one discrete system of light rays onto a collimator or other type of light receiving means so as to produce a modular system. By passing the light from each source through a pair of mosaic lenses and an aligning lens, arranged according to the invention, each discrete system presents a perfectly uniform field of light positioned with the fields from the other discrete systems to provide a continuous field of light. Another object of the invention is to provide a first or input mosaic lens through which the light from the discrete sources passes so as to share common elements of the input lens to produce perfect matching of the modular beams upon the collimator and in the fields reflected from it.

Another object of the invention is to provide a means for compensating for the decrease in illuminating capability which occurs in the use of reflecting paraboloidal collimators which inherently produce a field gradient. This occurs because of the increasing path lengths of the rays as they intersect the collimator at greater and greater distances from the parabolic axis. The farther off the parabolic axis that the source image is viewed, the greater will be the magnification, and as the flux density is inversely proportional to the magnification of the system, a decrease in the illuminating capability will exist.

By means of the modular nature of the invention, this decrease in illuminating capability can be compensated for in two ways. One way is by decreasing the magnification of the modules as they illuminate the field at increasing distances from the parabolic axis. This can be accomplished by the design and location of the input mosaic lenses and the collectors surrounding the light sources. The other way is to adjust the brightness of the sources of the individual modules to offset any change in magnification, thereby keeping the transmitted flux to any point in the field near constant. These concepts of the modular system provide the capability to use large off-axis angles on the collimator while still maintaining a good field uniformity.

Still another object of the invention is to provide an improved aligning lens referred to as a diffuser lens, which eliminates the effect of black lines imaged on the collimator and result from light blockage occurring at the intersections of the individual elements of the mosaic lenses. These black lines tend to vary the field uniformity and the diffuser lens minimizes the possible variation.

A further object of the invention is to provide a means in which light is properly distributed on the input mosaic lens element in order to produce a uniformity in the continuous field at the junction of the modules. As has been indicated above, the discrete fields are uniform, but in order to make the continuous field uniform, additional means are required. This is accomplished by the use of collector elements as disclosed in my U.S. Letters Patent No. 3,296,432.

A still further object of the invention is to provide a relationship of the optic elements to compensate for the off-axis gradient in the illuminated field. This is accomplished by positioning the input mosaic lens elements and the collectors containing the light sources so that they lie in parabolic surfaces of revolution which are geometrically proportional to that of the collimator. By this arrangement, the system has constant magnification at all points in the illuminated field.

Further objects and advantages of the invention may

3 be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 1 diagrammatically illustrates the optical arrangement of the invention;

FIG. 2 is a view of the optical system taken substantially as indicated by the line 2—2 in FIG. 1;

FIG. 3 is a front elevational view of an input mosaic lens taken as indicated by the line 3—3 in FIG. 1;

FIG. 4 is a front elevational view of an output mosaic lens taken as indicated by the line 4—4 in FIG. 1;

DESCRIPTION OF THE PREFERRED EMBODIMENTS

Figure 6:
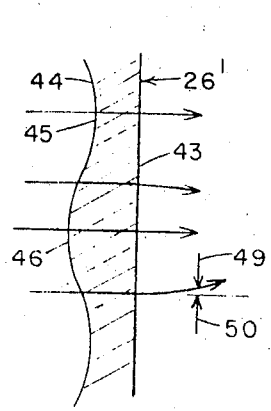
FIG. 6 is a fragmentary cross sectional view taken along the line 6—6 as indicated in FIG. 5.

Referring again to the drawings, there are shown in FIG. 1 three light collectors 10, 11 and 12, having nonconic surfaces of revolution, and each having a light source on respective optical axes 10a, 11a, and 12a. The collector is broken away to show the light source 12b, a 20 kw. Xenon compact arc lamp. Each light source has an adjustable, respective power supply 30, 31, and 32 and connecting circuitry. Each of the collectors together with their light sources, produces discrete and separate light beams indicated by their outer rays as 13, 13, 18, 18, and 19, 19.

FIG. 1 could be considered as showing a two dimensional system. In FIG. 2, the system is illustrated as three dimensional, having additional light sources and their respective collectors 36, 37, 38, 39, 40 and 41 and including the three, 10, 11, and 12, shown in FIG. 1, thus forming a nine module system.

Each of the beams is positioned to pass through an input mosaic lens 20, the optical axis of each beam likewise passing through the lens. As shown in FIG. 3 each of the mosaic elements 21 is a square, having a convex face toward the light sources and having a plane face away from the sources. The input lens has 36 separate mosaic quartz elements and is similar to the type shown in U.S. Letters Patent No. 2,326,970 to Rantsch, the individual elements being made separately to have sharp edges so that the curved surfaces are closer together than they would be if cast. It should be noted that each of the beams pass through certain of the elements 21 that are common to the other two. The collector must be designed to provide a nearly uniform distribution of light on the input mosaic lens.

Optically aligned with the input lens is a plano-convex output mosaic lens 24, having convex surfaces facing the input lens, and shown in FIG. 4 to be comprised of 16 quartz elements 25, slightly larger than the input elements. Each of the optical axes 10a, 11a, and 12a passes through the center of the output lens 24, and the output lens is shown to be of a size so that each beam passes through all of the elements 25. Optically aligned with the input and output lenses and spaced closely from the mosaic lens 24 on its output side is a convex-plano aligning lens 26, having a somewhat larger area than the total area of the output lens and having its convex face toward the latter.

It is not necessary that the input and output lenses be faced as shown. They were designed for the system as plano-convex lenses and positioned to reduce spherical aberration and coma. Other shapes of mosaic lenses could be used.

The beams produced by the light sources are reflected by an off-axis paraboloidal collimator 27, generally rectangular in the end view. The paraboloid of the collimator is off-axis in that the angle between the paraboloidal axis and the midpoint of the collimator, as measured from the focal point of the paraboloid is 26°, for example. Each of the beams form a uniform discrete field on the collimator as indicated by the outer rays 13, 13, 18, 18, and 19, 19. To more distinctly indicate the discreteness of the beams and their fields, the portion between the rays 13, 13 is shaded. Similarly, at 10c, 11c, and 12c, the beams also form three discrete fields and blend together to form one continuous field at all distances beyond the collimator.

The input lens 20, the output lens 24 and the aligning lens 26 form a projection system which is common to the discrete light sources and their collector systems. In passing through the projection system, the ray distribution from each collector is arranged to produce its uniform field on a specific area of the collimator and the collimator reflects the beam to the target region, indicated as the fields 10c, 11c, and 12c, where it produces the effect of a real image of the light apertures of the projection system at infinity.

The input mosaic elements serve to image the collector plane at the region of the output mosaic lens elements and the focal point of the collimator falls between the aligning lens and the output lens. In the plane of the input lens, the respective optical axes are separated by a specific distance and in the embodiment shown, this distance is exactly the width of one input mosaic element 21. Thus, the rays passing from the system produced by the collector and light source 10 in passing through the input elements at the plane 20 are displaced one input element's distance from the equivalent rays of the system of the collector 11 and two elements' distance from the equivalent rays of the system of the collector 12. Each of the systems utilizes sixteen input elements in the plane of the mosaic lens 20, but more than sixteen elements in the plane may be used if it proves to be advantageous to a particular design.

Each output mosaic lens element 25 forms a virtual image of an input mosaic aperture on each plane of the collector modules. Since there are 16 output mosaic elements, there is a superposition of 16 virtual images on each of the collector modules. This set of virtual images is focused upon the collimator by the aligning lens. Rays originating at the collector plane pass completely through the system and terminate on the target, as may be found in a test chamber where the projection system is used as a solar simulator.

As indicated in the embodiments shown, the output mosaic elements 25 are all common to the three systems because the optical axes of the systems cross in the plane of the output mosaic lens 24. The aligning lens 26 is also a common element although there is some displacement of the ray systems from each unit passing through it. The reflecting collimator 27 is also one element; however, the individual systems each illuminate a discrete portion of it. A field beyond the collimator thus possesses the characteristics of a modulator system in that the separate portions of the field are illuminated and controlled individually.

The following is a list of elements used in a projection system according to the invention, their dimensions being indicated in inches:

| | |
|---|---:|
| Radius of the collector aperture | 10.0 |
| Axial distance from the collector plane to the input mosaic plane | 202.448 |
| Input mosaic vertex thickness | 0.496 |
| Index of refraction of all lenses at 20° C. | 1.4584 |
| Length of side of input mosaic elements | 3.804±0.004 |
| Radii of curvature of input mosaic elements | 11.323±0.040 |
| Axial distance from input mosaic plane to output mosaic plane | 25.275 |
| Output mosaic vertex thickness | 0.625 |
| Length of side of output mosaic square elements | 4.2783±0.007 |
| Radii of curvature of output mosaic lens elements | 13.228 |
| Distance of plane of output mosaic lens to aligning lens | 2.0 |
| Vertex thickness of aligning lens | 2.0 |
| Edge thickness of aligning lens | 1.066 |
| Radius of curvature of aligning lens | 54.01 |
| Diameter of aligning lens | 23.00 |
| Axial distance from plane surface of aligning lens to collimator | 239.255 |
| Reflection area of collimator | 72 x 72 |

As indicated in the embodiment shown, the output mosaic elements 25 are all common to the three systems because the optical axes of the systems cross in the plane of the output mosaic lens 24. The aligning lens 26 is also a common element although there is some displacement of the ray systems from each unit passing through it. The reflecting collimator 27 is also one element; however, the individual systems each illuminate a discrete portion of it. A field beyond the collimator thus possesses the characteristics of a modular system in that separate portions of the field are illuminated and controlled individually.

Through each element of the output mosaic lens, there is projected an image of a square, made up of nine input elements, onto the collimator 27. This image carries with it a gridwork of black lines which result from light blockage that occurs when the nine elements meet. The magnification of these black lines is sufficiently large so that there results a significant deviation of the uniformity of the illuminated field beyond the reflecting surface of the collimator when the field is measured with a small photoelectric sensor.

Figure 5:
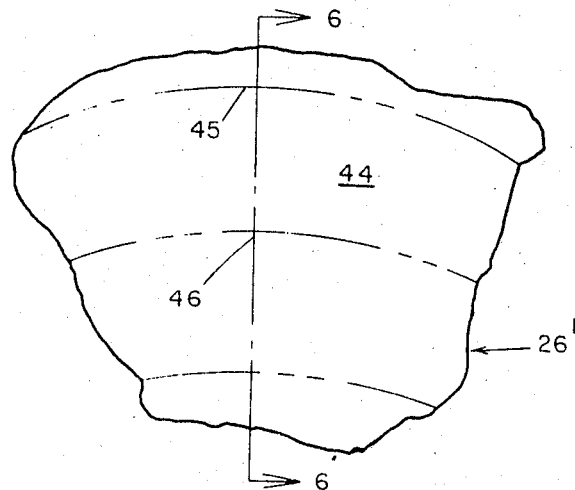
FIG. 5 is a fragmentary view of a front face of a diffuser aligning lens according to the invention.

According to the invention, to minimize the variations in the field uniformity resulting from these black lines, a variation of the aligning lens 26 is provided. This lens is referred to as a diffuser lens 26', and is shown in part in FIGS. 5 and 6. It has a plane surface 43 facing the collimator and the input surface 44 is generally convex but is comprised of a series of annular sinusoidal grooves 45, alternated with lands 46. The grooves lie in concentric circles on the lens surface so that they principally act in one plane for a beam of light coming through the aperture of any of the 16 output mosaic elements. In FIG. 6 the arrows show how the light is refracted in passing through the diffuser surface of the lens in the plane across the grooves. The pitch and depth of the grooves are designed so that the maximum spread of the emerging rays will diffuse the image just enough to produce the required effect. That is, the diffuser lens works on the principle of spreading the effects of light blockage from that of a line image to that of a diffused image covering a larger area. For example, if a distinct line image is spread over a larger area, the resulting field variation is more uniform. The arrows 49 and 50 in FIG. 6 illustrate the maximum refraction angle that is desirable to create the diffuser effect. The lands and grooves may be formed in either surface of the aligning lens.

As previously indicated, each discrete field of light as produced by a single light source and its collector, as an individual system, is produced uniformly on the collimator and in the fields reflected therefrom. Whereas, each of the discrete fields on the collimator are arranged with the above described structures to produce a continuous field, there is not always a uniformity of intensity in light at the juncture of adjoining fields. These variations between discrete fields will result if continuous collectors are used. These variations usually do not exist within a single module as the nature of the mosaic system is to balance the incident rays from both the weak and the strong portions of the illuminating sources within the field of the module. However, when the field receives flux from two or more adjacent modules, this balance does not exist unless the proper input distribution is maintained.

Figure 7:
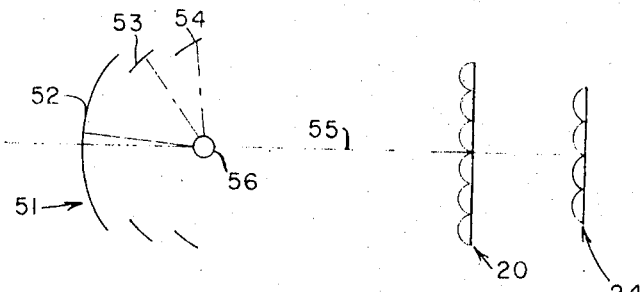
FIG. 7 is a diagrammatic view of a segmented collector and light source.

This kind of distribution and a uniform, continuous field are obtained in the system with the use of segmented collectors similar to those described in my U.S. Letters Patent No. 3,296,432. Such a collector, generally designated as 51, is shown in FIG. 7. The light collecting means 51 is comprised of three annular segments 52, 53, and 54 positioned concentrically about an axis 55, equivalent to the axis 10a in FIG. 1, for example, and the respective planes of their mean circumferences are normal to the axis 55 upon which the light source 56 is positioned. The segments are ellipsoid in cross section and are tilted with respect to the optical axis 55.

Each segment is appreciably a section of a canted ellipse of revolution which projects light from the source 56 to a second focal plane which is the plane of the input lens 20, the first focus being at the source. The outer segment 54 is designed to project light from the source to produce an outer annulus or band of light on the second focal plane, the band having a mean diameter which is that of a circle which approximately circumscribes the input lens. The second segment 53, in a similar manner, projects light from the source to produce a second band on the second focal plane, radially inwardly of, contiguous and concentric with the outer band. The third and/or other inner segments, as 52, project similar radially inwardly bands to provide, with the other segments, a continuous, uniform illuminated plane at the input lens 20.

The segments preferably are formed or chosen so that the inner diameter of the larger reflector 54 is approximately equal to the outer diameter of the intermediate reflective surface on the segment 53, and so that the inner diameter on the reflector 53 is approximately equal to the outer diameter of the reflector 52.

Although described and shown as annular sections of different ellipsoids, the separate annular reflective surfaces need not conform exactly to the curvature of an ellipse. In practice, when a plurality of segments is used, each of which has a width along a major axis 55 of approximately one tenth of its mean diameter, the surfaces do not need to be precisely elliptical but may be circular conic sections having an angulation such that the surfaces correspond respectively to the chords of the elliptical segments of 52, 53, and 54.

The light rays emanating from the reflective elements 52, 53, and 54 pass through the mosaic lenses and the aligning lens as described above and are directed to the off-axis paraboloidal collimator 27, where each of the uniform discrete fields produced by individual multi-segment collectors together form a continuous and uniform field on the collimator and in the field reflected therefrom.

The reflecting paraboloidal collimator inherently produces a field gradient because of the increasing path lengths of the rays as they intersect the collimator at greater and greater radial distances from the paraboloidal axis. Thus, the farther off the parabolic axis that the source image is viewed, the greater will be the magnification, and as the flux density is inversely proportional to the magnification of the system, a decrease in the illuminating capability will exist. As a result of the modular nature of the invention, this decrease in illuminating capability can be compensated for in two ways. One way is by decreasing the magnification of the modules as they illuminate the field at increasing distances from the parabolic axis. This can be accomplished by the design and location of the input mosaic lenses and the collectors.

Figure 10:
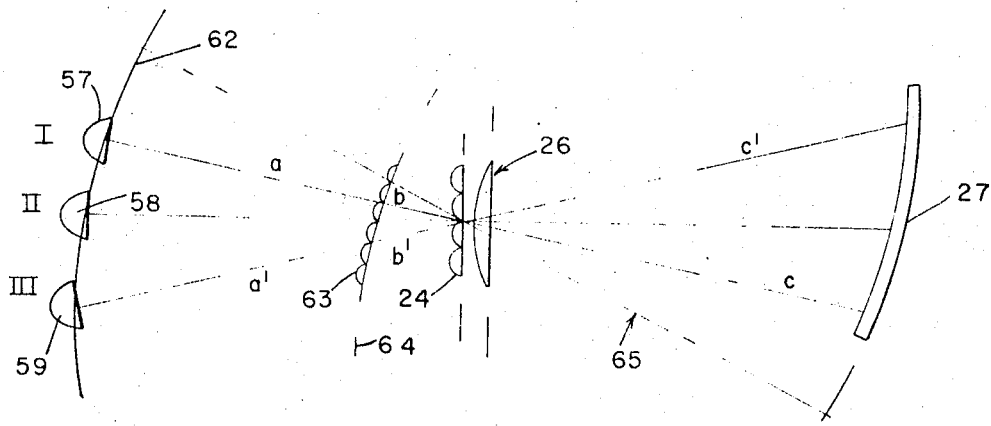
FIG. 10 is a diagrammatic view of another embodiment of the invention.

In FIG. 10 another embodiment of the invention is illustrated in which the optical elements are arranged and constructed to compensate for the off-axis gradient in the illuminated field. Here the collectors 57, 58, and 59, equivalent to those shown in FIG. 1, are positioned to lie on a parabolic surface of revolution 62, and similarly an input mosaic lens 63 is curved to lie on a parabolic surface of revolution 64, both of which are geometrically proportional to that of the collimator 27. This system produces a constant magnification at all points of the illuminated field and a perfect nesting of the input mosaic elements is obtained.

The foregoing results may be shown mathematically by referring to FIG. 10 where the parabolas on which the collectors and input lens are located are similar to that of the collimator paraboloid, then the magnification of the ray system on the collector at I is:

$$M_I = \left(\frac{b}{a}\right)\left(\frac{c}{b}\right) = \frac{c}{a}$$

and the magnification from the collector indicated at III is:

$$M_{III} = \left(\frac{b^1}{a^1}\right)\left(\frac{c^1}{b^1}\right) = \frac{c^1}{a^1}$$

and by symmetry:

$$a/a^1 = c/c^1$$

Then:

$$a/c = a^1 c^1$$

or $$M_I = M_{III}$$

It also follows from the foregoing that the size of the modular components on the collimator will be the same for all modules. Because of the constant dimensional relationship between the collimator and the parabolic surface on the input lens, the axis of the parabolas being designated as 65, the input mosaic elements mate to form a continuous surface in the same manner that modular components of the rays of the system mate to produce a continuous output beam on the collimator of uniform magnification and illumination.

In this embodiment, meniscus lenses should be used in the input lens because if they are not, the black lines at the intersections of the lenses will be excessively large when projected on the collimator because of the oblique angles in which the rays pass through the peripheral lens elements of each module.

The other way to compensate for the decrease in illuminating capability is to adjust the brightness of the sources of the individual modules to offset any change in magnification, thereby keeping the transmitted flux to any point in the field near constant. In FIG. 1, the adjustable power supplies 31, 32, and 33 for each light source permit the intensities of the light sources to be varied to achieve and maintain uniformity in the field illuminated.

Figure 9:
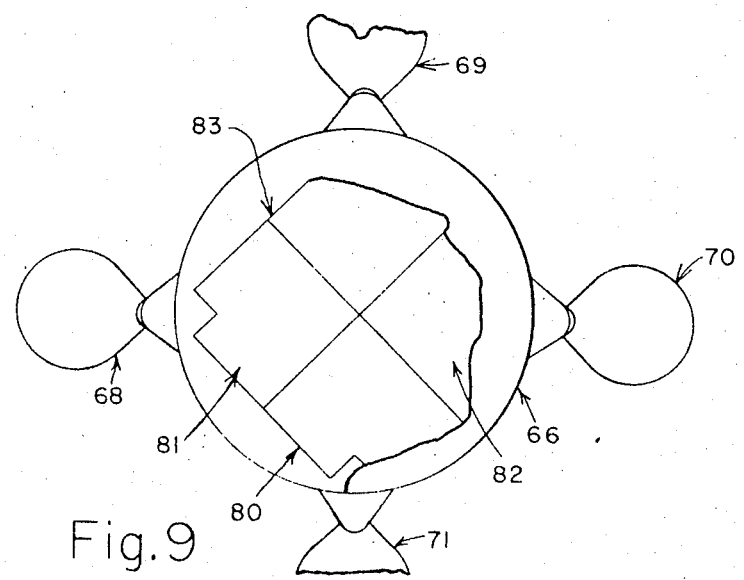
FIG. 9 is a broken away top view of the test chamber as shown in FIG. 8.
Figure 8:
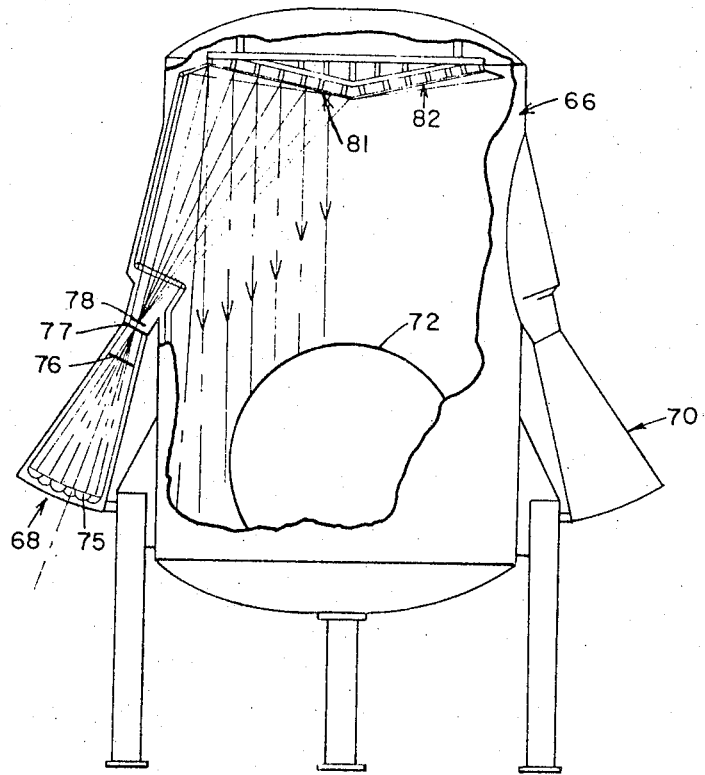
FIG. 8 is a broken away view of a space test chamber employing a solar simulator according to the invention.

In FIGS. 8 and 9 there is illustrated the employment of the optical system shown in FIG. 1 in a practical arrangement where four of the systems are designated as 68, 69, 70, and 71. The test chamber 66 here is similar to that described in my U.S. Letters Patent No. 3,296,432 and need not be described in detail.

The four optical systems forming the solar simulator or a group of solar simulators would approximate the sun's intensity upon a test zone 72. The system 68 is shown in detail and there a plurality of collectors and light sources 75 produce radiation which passes through an input lens 76, an output lens 77, and an aligning lens 78, respectively, similar to the lenses 20, 24, and 26 (or 26') in FIG. 1. Here, as indicated in FIG. 9, there are four separate collimators 80, 81, 82, and 83, one for each system. Since each of the collimators is off-axis, no light can be reflected back into the various collimators from the test zone. This simulates the condition in outer space; that is, any energy originating at or reflecting from the test zone must be completely attenuated or absorbed and not reflected back into the test sample by the reflecting apparatus forming the collimated beams.

It is clear that any number of modules may be integrated into one system, as illustrated in FIGS. 1 and 8, and a plurality of systems may be placed adjacent to each other, as they are in FIGS. 8 and 9, to produce larger simulated solar beams. A good field uniformity is maintained at the junction of these collimated systems because the principle used in the input distribution is also valid for the intersection of the system.

In the embodiment shown, square mosaic elements have been described for illustrative purposes, and because a square beam is desirable if any two or more systems are to be placed together, as shown in FIGS. 8 and 9. However, hexagonal mosaic lens elements may be used to produce a beam of hexagonal shape. The discussion used to describe the square system are equally applicable to the hexagonal system.

The invention and its attendant advantages will be understood from the foregoing description, and it will be apparent that various changes may be made in the form, construction and arrangement of the parts of the invention without departing from the spirit and scope thereof or sacrificing its material advantages, the arrangement hereinbefore described being merely by way of example. I do not wish to be restricted to the specific forms shown or uses mentioned except as defined in the accompanying claims, wherein various portions have been separated for clarity of reading and not for emphasis.

What is claimed is:

1. A radiant energy collimating system comprising:
    (a) a plurality of discrete light sources;
    (a₁) a single lens;
    (b) a single reflecting collimator; and
    (c) means associated with said light sources, said single lens and said collimator to distribute light received from said sources for each of said sources and for forming one continuous field of said discrete fields.

2. The invention, according to claim 1, in which: said last means includes each of said light sources having a reflecting collector.

3. The invention, according to claim 2, in which:
    (a) said last means are comprised of a positive input lens element, a positive output lens element and a positive aligning lens;
    (b) said input and output lens elements and said aligning lens being optically aligned, the optical axis of each collector and of its light source extending through each of said lens elements;
    (c) said input lens element being adjusted to produce each collector image onto the output lens element;
    (d) said output lens element being adapted to produce a compound virtual image of the input lens element for each collector in a plane adjacent each respective collector; and
    (e) said aligning lens being adapted to produce a real image of said virtual images on said collimator to form said uniform field of light.

4. The invention, according to claim 2, in which:
    (a) said last means are comprised of a positive input lens element, a positive output lens element, and a positive aligning lens;
    (b) said input and output lens elements, and said aligning lens being optically aligned;
    (c) the optical axis of each collector and of its light source extending through each of said lens elements; and
    (d) said input and output lens elements are mosaic lenses.

5. The invention, according to claim 4, in which:
the collectors and the input lens are positioned so that the light beam from each collector passes through some common mosaic elements of said input lens to produce matching discrete beams of light on the collimator and in the field of light reflected therefrom.

6. The invention, according to claim 5, in which:
the collectors, the input and the output lenses are positioned so that the beams of light from each collector pass through the same mosaic elements in the output lens at least with respect to one plane of reference, whereby the light apertures of the output mosaic elements, as seen through the aligning lens, appear to be imaged at infinity when viewed through the collimator.

7. The invention, according to claim 3, in which:
said input and output lens elements are mosaic lenses.

8. The invention, according to claim 7, in which:
the collectors and the input lens are positioned so that the light beam from each collector passes through some common mosaic elements of said input lens and each beam passes through the same number of mosaic elements to produce perfect matching of the discrete beams on the collimator and in the field of light reflected therefrom.

9. The invention, according to claim 8, in which:
(a) the mosaic elements in the input and output lenses are squares; and
(b) each square forming a separate lens.

10. The invention, according to claim 9, in which:
the optical axes of the collectors are separated a predetermined distance from each other in said input mosaic lens.

11. The invention, according to claim 6, in which:
the optical axes of the collectors are separated a predetermined distance from each other in said input mosaic lens.

12. The invention, according to claim 5, in which:
the beam from each collector passes through the same amount of mosaic elements in the input lens with respect to at least one plane of reference.

13. The invention, according to claim 1, including:
(a) the collimator having paraboloidal reflecting surface; and
(b) means to vary the light from said discrete sources so as to maintain uniform reflectivity from all parts of the collimator.

14. The invention, according to claim 6, including:
(a) collimator having paraboloidal reflecting surface; and
(b) means to vary the light from said discrete sources so as to maintain uniform reflectivity from all parts of the collimator.

15. The invention, according to claim 1, in which:
(a) the discrete light sources are positioned so as to be three-dimensionally located with respect to each other;
(b) said means to distribute light are comprised of a positive input lens element, a positive output lens element and a positive aligning lens, said lenses being optically aligned;
(c) the optical axis of each light source extending through each of said lenses;
(d) said input and output lenses being mosaic lenses;
(e) said output lens being capable of producing images having a gridwork of black lines resulting from light blockage occurring from the boundaries of the mosaic elements forming the input mosaic lens; and
(f) means included in said lenses to spread the effects of said light blockage from that of a line image to that of a diffused image covering a larger area.

16. The invention, according to claim 15, in which:
said means included is in said aligning lens.

17. The invention, according to claim 16, in which:
said aligning lens has a general convex surface facing said output lens and a plane surface facing said collimator.

18. The invention, according to claim 17, wherein:
one of said surfaces of said lighting lens is comprised of annular, concentric sinusoidal lands and grooves so as to primarily act in one plane for a beam of light coming through the aperture of any one of the output mosaic elements.

19. The invention, according to claim 2, including:
means forming each of said collectors to produce a uniform field of light of said continuous field formed of said discrete uniform fields.

20. The invention, according to claim 2, in which:
(a) each of said collectors having at least two reflective surfaces with each of said surfaces being symmetrically disposed relative to a central axis through the respective light source;
(b) each of said surfaces having a radial cross section which substantially corresponds to a segment of a canted ellipse of revolution; and
(c) each of said surfaces being positioned to project radially positioned contiguous bands of light from a respective source so that the discrete fields of light on the collimator form one uniform field.

21. The invention, according to claim 20, including:
said reflective surfaces having a width substantially less than the radial distance from the respective source to said reflective surfaces.

22. The invention, according to claim 4, including:
means forming each of said collectors to produce a uniform field of light from said continuous field formed of said discrete uniform fields.

23. The invention, according to claim 8, including:
means forming each of said collectors to produce a uniform field of light from said continuous field formed of said discrete uniform fields.

24. The invention, according to claim 13, including:
means forming each of said collectors to produce a uniform field of light from said continuous field formed of said discrete uniform fields.

25. The invention, according to claim 2, in which:
(a) said means between light sources and said collimator include input lens means;
(b) said collimator being paraboloidal and being off its paraboloidal axis; and
(c) said input lens means and said collectors being spacially positioned with respect to the collimator to produce constant magnification at all points in the continuous light field on the collimator.

26. The invention, according to claim 2, in which:
(a) said means between light sources and said collimator include input lens means,
(b) said collimator being paraboloidal and off its paraboloidal axis; and
(c) said input lens means and said collectors are lying on parabolic surfaces of revolution which are geometrically proportional to that of the collimator to compensate for the off-axis gradient so as to produce constant magnification at all points in the continuous light field on the collimator.

27. The invention, according to claim 4, in which:
(a) said collimator being paraboloidal and off its axis;
(b) said input mosaic lens and collectors are lying on parabolic surfaces of revolution geometrically proportioned to that of the collimator to compensate for the off-axis gradient so as to produce constant magnification at all points in the continuous light field on the collimator.

28. The invention, according to claim 4, in which:
(a) the collimator has a paraboloidal reflecting surface which is off its axis.

29. The invention, according to claim 28, including:
means to vary the light from said discrete sources so as to maintain uniform reflectivity from all parts of the collimator.

References Cited

UNITED STATES PATENTS

| | | | |
|---|---|---|---|
| 3,144,806 | 8/1964 | Smith | 352—70 |
| 3,187,339 | 6/1965 | Clay. | |
| 3,356,002 | 12/1967 | Raitiere. | |
| 1,627,892 | 5/1927 | Frederick. | |
| 2,877,342 | 3/1959 | Beach | 240—106.1 XR |
| 3,225,188 | 12/1965 | Le Vantine | 240—41.1 |
| 3,296,432 | 1/1967 | Le Vantine | 240—41.3 |
| 3,296,923 | 1/1967 | Miles | 240—41.3 XR |
| 3,379,067 | 4/1968 | Wallace et al. | 240—1.1 XR |

FOREIGN PATENTS

| | | |
|---|---|---|
| 653,914 | 5/1951 | Great Britain. |
| 504,388 | 12/1954 | Italy. |

NORTON ANSHER, Primary Examiner

R. P. GREINER, Assistant Examiner

U.S. Cl. X.R.

240—1.1, 41.1